United States Patent
Boren et al.

(10) Patent No.: US 9,248,913 B2
(45) Date of Patent: Feb. 2, 2016

(54) ATTITUDE CONTROL OF AN AIRCRAFT IN A DITCHING CONDITION

(71) Applicant: THE BOEING COMPANY, Chicago, IL (US)

(72) Inventors: Kelly L. Boren, Marysville, WA (US); Sergey D. Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 503 days.

(21) Appl. No.: 13/921,012

(22) Filed: Jun. 18, 2013

(65) Prior Publication Data

US 2014/0367520 A1    Dec. 18, 2014

(51) Int. Cl.
  *B64C 35/00* (2006.01)
  *B64D 25/00* (2006.01)
  *B64C 17/08* (2006.01)

(52) U.S. Cl.
  CPC .............. *B64D 25/00* (2013.01); *B64C 17/08* (2013.01)

(58) Field of Classification Search
  CPC ................................ B64C 17/08; B64D 25/00
  USPC ......................................... 244/1 R, 107, 105
  See application file for complete search history.

(56) References Cited

U.S. PATENT DOCUMENTS

| 2,117,234 | A  | * | 5/1938  | Austin et al. ............... 244/94 |
| 3,590,399 | A  |   | 7/1971  | Madden |
| 4,255,883 | A  |   | 3/1981  | Ealy |
| 8,302,903 | B2 |   | 11/2012 | Morgan |
| 2004/0139899 | A1 | * | 7/2004 | Scott ........................... 114/125 |
| 2010/0200689 | A1 | * | 8/2010 | Grip ................................ 244/2 |

FOREIGN PATENT DOCUMENTS

| EP | 0592317 A1 | 4/1994 |
| FR | 782490 | 6/1935 |
| GB | 205491 | 10/1924 |

* cited by examiner

*Primary Examiner* — Christopher P Ellis
*Assistant Examiner* — Richard G Davis
(74) *Attorney, Agent, or Firm* — Duft Bornsen & Fettig LLP

(57) ABSTRACT

Configurations provide rapid adjustment to an aircraft attitude in the water upon an emergency water landing. In one configuration, an aircraft fuselage has a forward compartment that includes a water intake and an air vent. The water intake is located below an expected waterline upon ditching the aircraft in water and transports a flow of water to the forward compartment at a designed flow rate. The air vent is positioned at a height in the forward compartment and allows a desired volume of water to fill the forward compartment and adjust an attitude of the aircraft within a time period.

20 Claims, 5 Drawing Sheets

ATTITUDE CONTROL OF AN AIRCRAFT IN A DITCHING CONDITION

FIELD

This disclosure relates to the field of aircraft and in particular, to aircraft that may experience emergency landings in water.

BACKGROUND

Performing a controlled emergency landing of an aircraft in water is known as "ditching". Various governmental agencies provide regulations as to how an aircraft will perform immediately after ditching. For instance, the United States Federal Aviation Administration (FAA) provides regulations regarding the float time and trim of a ditched aircraft with the goal of allowing the passengers to exit the aircraft within 90 seconds. See, for example, FAA Federal Aviation Regulations (FAR) 25.803

One problem experienced by passengers attempting to exit a ditched aircraft is caused by the trim or attitude of the aircraft as it floats in the water. In some configurations or loadings, the aircraft may float in an orientation that hinders the safe exit of the aircraft. For instance, the aircraft may float in a more tail-down attitude, which may place the waterline on the fuselage across the rear emergency doors. In a tail-down attitude, water at the rear emergency doors would prevent those doors for being used to exit the aircraft and increase the amount of time necessary for the passengers to exit. However, due to the short amount of time allotted for exiting the aircraft in such situations, little time exists to correct this problem.

In view of the above discussion, problems remain for controlling the attitude of an aircraft that has been ditched.

SUMMARY

Configurations described herein provide for rapid adjustment of an attitude of an aircraft upon ditching using a controlled fill of a forward compartment with water. The controlled fill places more weight forward of a center of gravity of the aircraft, which allows the attitude of the aircraft to be adjusted in the water. For example, adjusting the attitude of the aircraft to a more level orientation in the water may allow for more emergency doors to be utilized during evacuation, may allow the passengers to traverse the cabin more easily, etc.

One configuration comprises an aircraft fuselage having a forward compartment. The fuselage includes a water intake that is located below an expected waterline upon ditching the aircraft in water to transport a flow of water to the forward compartment at a designed flow rate of water. The fuselage further includes an air vent in the forward compartment that is positioned at a height to allow a desired volume of water to fill the forward compartment and adjust an attitude of the aircraft within a time period.

Another configuration comprises a fabrication method. The method comprises positioning a water intake on an aircraft fuselage below an expected waterline upon ditching the aircraft in water to transport a flow of water to a forward compartment at a designed flow rate. The method further comprises positioning an air vent in the forward compartment at a height to allow a desired volume of water to fill the forward compartment and adjust an attitude of the aircraft within a time period.

Another configuration comprises an aircraft fuselage having a forward compartment. The fuselage includes a water intake located below an expected waterline upon ditching the aircraft in water to transport a flow of water to the forward compartment. The fuselage further includes a valve that couples the water intake to the forward compartment to control a flow rate of the water to the forward compartment. The fuselage further includes a vent in the forward compartment to expel displaced air and allow water to fill the forward compartment and adjust an attitude of the aircraft within a time period.

The features, function, and advantages that have been discussed can be achieved independently in various configurations or may be combined in yet other configurations farther details of which can be seen with reference to the following description and drawings.

DESCRIPTION OF THE DRAWINGS

Some configurations are now described, by way of example only, and with reference to the accompanying drawings. The same reference number represents the same element or the same type of element on all drawings

DESCRIPTION

The figures and the following description illustrate specific exemplary configurations. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific configurations or examples described below, but by the claims and their equivalents.

Figure 1:
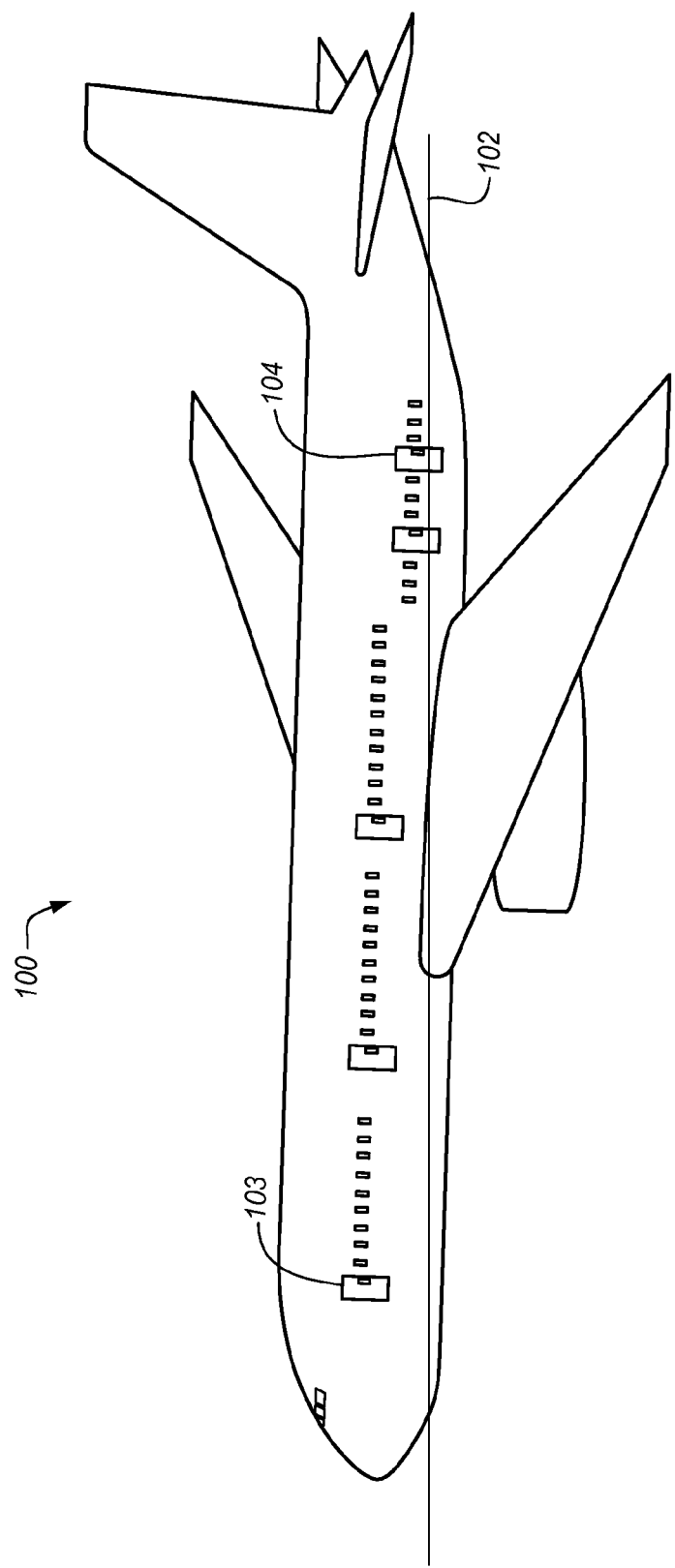
FIG. 1 is a side view of a ditched aircraft in an exemplary configuration.

FIG. 1 is a side view of a ditched aircraft 100 in an exemplary configuration. Aircraft 100 in FIG. 1 is floating in water and therefore, a waterline 102 runs along the side of the fuselage of aircraft 100. Aircraft 100 includes a number of exit doors 103-104. In this configuration, exit doors 104 are rear exit doors, and may be situated lower on the fuselage than exit doors 103. In this configuration, aircraft 100 floats in the water in FIG. 1 in a tail-down configuration. This type of configuration may arise for certain aircraft designs or loadings. For instance, aircraft 100 may have an unloaded center of gravity that lies more towards the tail than the cockpit by design, and/or may have more cargo weight loaded aft than forward, etc.

When aircraft 100 is ditched, it is generally desirable to exit aircraft 100 as soon as possible (e.g., within about a minute and a half). However, in a tail-down configuration, waterline 102 may cross various exit doors 103-104 of the fuselage of aircraft 100, which precludes those doors from being opened. For example, because exit doors 104 are partially under waterline 102, opening exit doors 104 would result in water entering and flooding aircraft 100. This may result in aircraft 100 rapidly sinking. Thus, the flight crew is trained to keep any exits closed that may be partially or fully below waterline 102 when aircraft 100 is ditched. This reduces the number of exits that may be utilized by the passengers, which is problematic due to the short amount of time allotted for exiting the aircraft. In this configuration, aircraft 100 has been enhanced to provide a rapid adjustment to an attitude of aircraft 100 upon ditching using a controlled fill of a forward compartment (e.g. a nose landing gear wheel well) with water. The controlled fill of a forward compartment on aircraft 100 will be discussed in more detail below.

Figure 2:
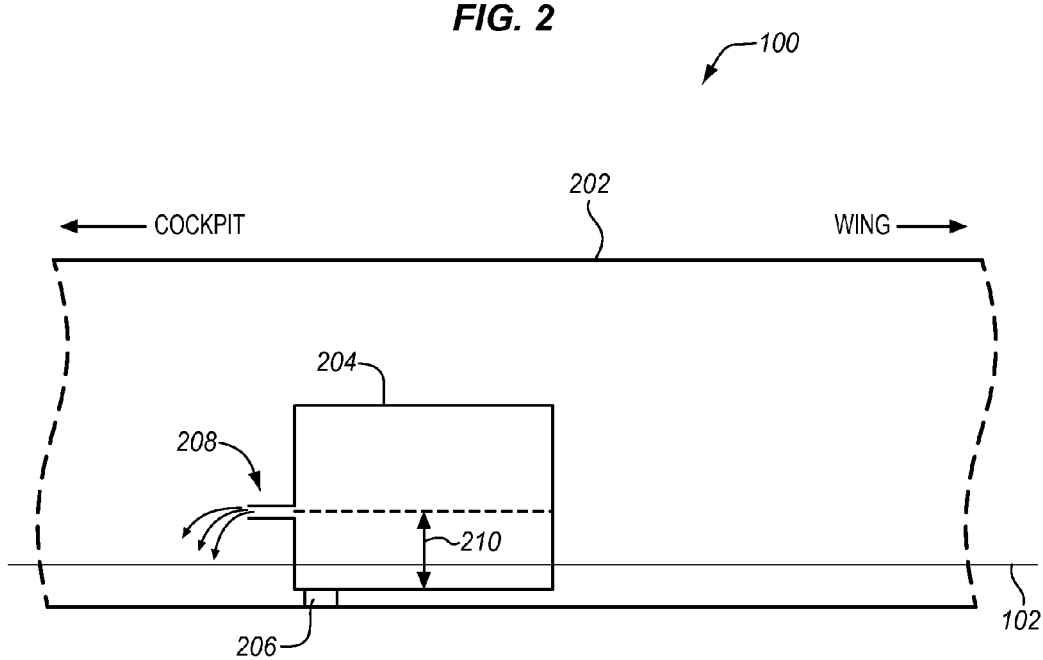
FIG. 2 is side view of a fuselage of a ditched aircraft in an exemplary configuration.

FIG. 2 is side view of a fuselage 202 of aircraft 100 in an exemplary configuration. In this configuration, fuselage 202 includes a forward compartment 204. "Forward" in this configuration means located somewhere between the cockpit and the wing of aircraft 100. However, the particular location of compartment 204 is a matter of design choice. For instance, compartment 204 may be a wheel well for the nose gear of aircraft 100. Further, although only one compartment 204 is illustrated in FIG. 2, multiple compartments may be utilized in a manner similar to what will be described with regard to compartment 204.

Compartment 204 includes a water intake 206. Water intake 206 is configured on fuselage 202 below waterline 102 and transports water into compartment 204 at a controlled rate. In this configuration, water intake 206 is not an incidental leak of water into an interior space of fuselage 202, but instead is a fabricated structure that is designed to transport a large amount of water into compartment 204 within a short amount of time. One example of the flow rate of water that water intake 206 transports is at least 75 gallons per second. In some configurations, water intake 206 may be a feature on retractable doors for a nose gear wheel well of aircraft 100.

Compartment 204 further includes an air vent 208. Air vent 208 is included in compartment 204 in this configuration to allow for a controlled amount of water to rapidly displace air trapped in compartment 204. The air may be vented to another compartment within fuselage 202, may be vented outside of fuselage 202, etc., as a matter of design choice. Typically, compartment 204 is nearly air tight. One analogy would be an inverted cup held under water. Although an inverted cup has a large opening at the bottom, no water flows into the cup due to the air trapped in the cup. In this configuration, air vent 208 not only allows for air to be displaced as water enters compartment 204, air vent 208 is placed at a particular height 210 within compartment 204 to allow a pre-determined volume of water to fill compartment 204. As water enters compartment 204, air vent 208 allows air to be displaced by the water and vented from compartment 204 until the level of water reaches height 210 within compartment 204. After the water reaches height 210, air trapped within compartment 204 can no longer be vented via air vent 208. Thus, a top portion of compartment 204 would be analogous to an inverted cup, trapping air. Therefore, height 210 is not merely an incidental feature of FIG. 2 but rather, is selected with a number of design criteria in mind. For instance, an aircraft designer may select height 210 to introduce a fixed volume of water into compartment 204. The fixed volume of water may then be used to calculate a weight that adjusts how aircraft 100 floats in the water.

The combination of air vent 208 and water intake 206 are designed to rapidly introduce a large controlled volume of water into compartment 204 within a short period of time. The volume of water moves the center of gravity of aircraft 100 forward towards the cockpit, which then adjusts the attitude of aircraft 100 in the water. This process occurs rapidly. For instance, the volume of water may be introduced into compartment 204 within about 10 seconds. As discussed, typical goals for exiting aircraft 100 upon ditching is less than 90 seconds. Thus, one goal for the introduction of water into compartment 204 is to adjust the attitude of aircraft 100 rapidly to allow more exit doors 103-104 to be opened by the flight crew during the evacuation process.

Figure 3:
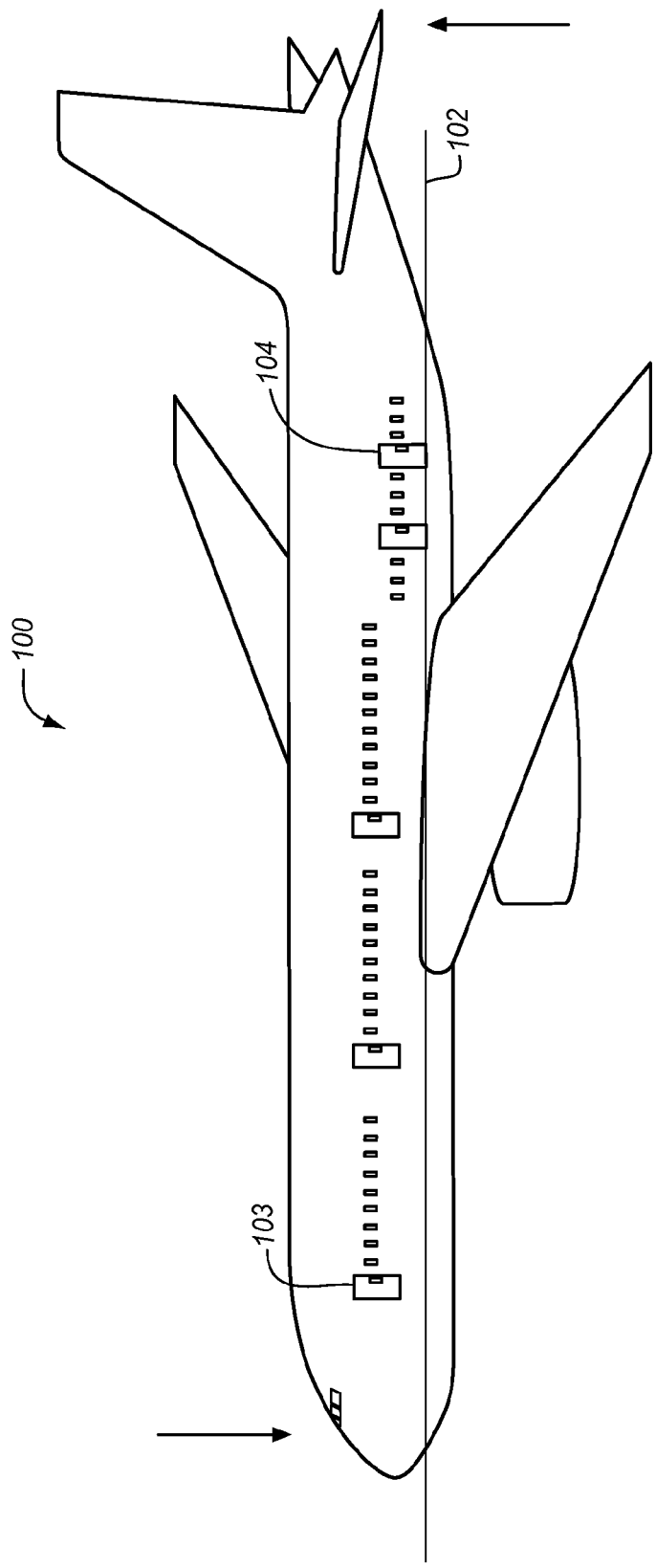
FIG. 3 is another side view of a ditched aircraft in an exemplary configuration.

FIG. 3 is another side view of ditched aircraft 100 in an exemplary configuration. FIG. 3 illustrates how the attitude of aircraft 100 may be adjusted after water is introduced into compartment 204. In particular, the nose of aircraft 100 moves down, as indicated by the arrow. Further, the tail of the aircraft moves up, as indicated by the arrow. Exit doors 104 which were partially covered by waterline 102 (see FIG. 1) are now substantially clear of water. Thus, exit doors 104 could be opened by the flight crew and utilized by passengers when exiting aircraft 100.

Although aircraft 100 is illustrated as substantially level in FIG. 3 subsequent to introducing water into compartment 204, other attitudes may be desirable. For instance, a more nose-down attitude may be desirable in cases where rear exit doors are low on the fuselage. In this case, aircraft 100 may be positioned nose-down to raise the tail of aircraft 100 farther out of the water.

One advantage of rapidly adjusting the attitude of aircraft 100 in a ditching condition is that passengers and crew may perform an emergency evacuation more efficiently and safely. Although ditching an aircraft is still relatively rare, ensuring that the FAA regulations are met is an aircraft design requirement.

Figure 4:
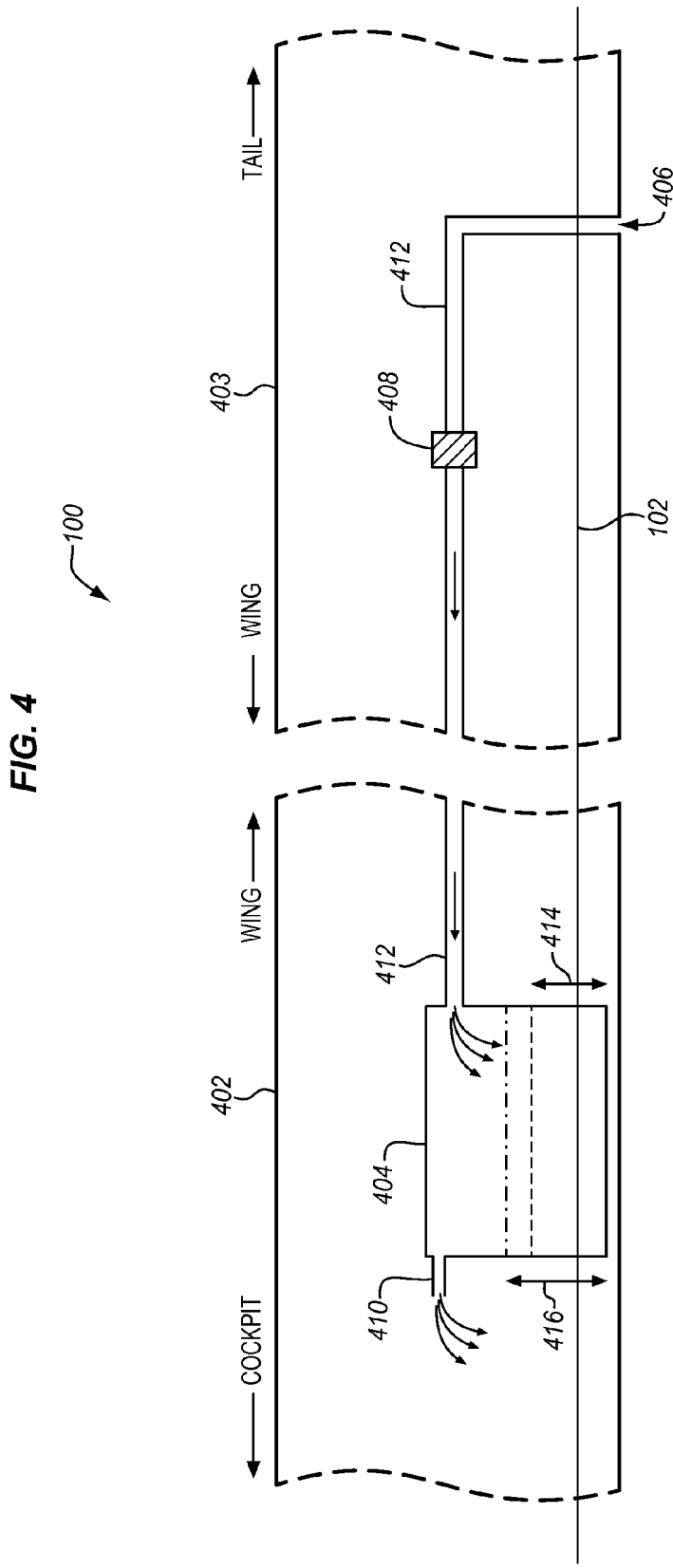
FIG. 4 is another side view of a fuselage of a ditched aircraft in an exemplary configuration.

FIG. 4 is side view of a fuselage 402-403 of aircraft 100 in another exemplary configuration. In this configuration, aircraft 100 includes a forward fuselage 402 and a rear fuselage 403. Forward fuselage 402 has a forward compartment 404 and tubing 412 that transports water from a water intake 406 located towards the rear of aircraft 100 to compartment 404. One example of a location of water intake 406 along rear fuselage 403 is proximate to the tail of aircraft 100.

In this configuration, a valve 408 controls a flow of water to compartment 404. For example, valve 408 may be normally closed upon ditching and manually opened by a member of the flight crew to allow water to fill compartment 404 and adjust the attitude of aircraft 100 in the water. Compartment 404 also includes a vent 410. Vent 410 expels trapped air from compartment 404 to allow water to fill compartment 404. As water fills forward compartment 404, the weight of the water applies a rotational moment to aircraft 100. The rotational moment adjusts the attitude of aircraft 100 in the water. When a desired attitude is reached, valve 408 may then be closed to stop the flow of water into compartment 404. For example, aircraft 100 may float substantially level in response to a height 414 of water in forward compartment 404 under specific cargo loadings. However, in other loadings, a larger volume of water may be utilized to place aircraft 100 substantially level in the water, as indicated by height 416 of water in forward compartment 404. Thus, valve 408 allows for a dynamic adjustment of the attitude of aircraft 100 that can respond to various configurations and loadings of aircraft 100.

Figure 5:
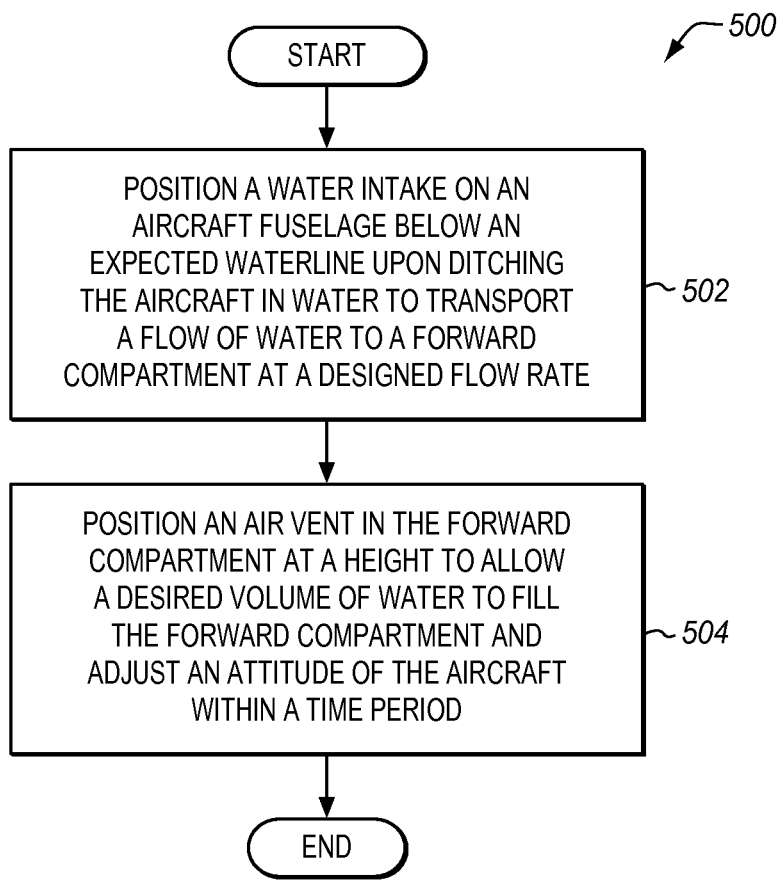
FIG. 5 is a method of fabricating a fuselage in an exemplary configuration.

FIG. 5 is a method 500 of fabricating a fuselage in an exemplary configuration. Consider, for example, that an aircraft manufacturer desires to implement attitude control of an aircraft in a ditching condition. During design of the aircraft, a designer may perform a simulation to identify an expected center of gravity of the aircraft floating in water after a ditching condition. In some cases, the center of gravity may be located aft on the fuselage, which puts the aircraft in a tail-down attitude in the water. A forward compartment may be identified to adjust the center of gravity forward on the fuselage utilizing a controlled fill of water into the compartment. During fabrication of the aircraft, the following steps may be performed to implement the attitude control functionality.

In step 502, a water intake is positioned on the aircraft fuselage below an expected waterline upon ditching the aircraft in water. The expected waterline may be determined during simulation of the aircraft. The water intake transports a flow of water to the forward compartment at a design flow rate. The designed flow rate may be selected, for example, based on how quickly the forward compartment is filled with a pre-determined amount of water.

In step 504, an air vent is positioned in the forward compartment at a height to allow a desired volume of water to fill the forward compartment and adjust the attitude of the aircraft within a time period. Positioning the air vent at a particular height allows for a controlled volume of water to be placed forward on the fuselage, which translates into a particular amount of weight placed forward on the fuselage. This forward weight is selected by the designer during design of the aircraft to re-position the aircraft in the water upon ditching, thereby allowing the aircraft to achieve a desired attitude in the water.

Although specific configurations are described herein, the scope is not limited to those specific configurations. Rather, the scope is defined by the following claims and any equivalents thereof.

The invention claimed is:

1. An apparatus comprising:
an aircraft fuselage having a wheel well for a nose landing gear, the fuselage including:
a water intake located below an expected waterline upon ditching the aircraft in water to transport a flow of water to the wheel well at a designed flow rate of water; and
an air vent in the wheel well positioned at a height to allow a desired volume of water to fill the wheel well and adjust an attitude of the aircraft within a time period.

2. The apparatus of claim 1 wherein:
the time period to adjust the attitude of the aircraft is based on the designed flow rate of water and the desired volume of water.

3. The apparatus of claim 1 wherein:
the time period to adjust the attitude of the aircraft is less than about 10 seconds.

4. The apparatus of claim 1 wherein:
the water intake is located on doors for the wheel well.

5. The apparatus of claim 1 wherein:
the designed flow rate of water is at least 75 gallons per second.

6. The apparatus of claim 1 wherein:
the height of the air vent is positioned to allow the desired volume of water to fill the wheel well and raise a rear emergency door above the expected waterline within the time period.

7. The apparatus of claim 1 wherein:
the water intake is located toward a rear section of the fuselage; and
the fuselage further includes:
tubing coupled with the water intake to transport the flow of water from the rear section of the fuselage to the wheel well.

8. The apparatus of claim 1 wherein:
the fuselage further includes:
a valve coupling the water intake to the wheel well to adjust the designed flow rate of water.

9. A method comprising:
positioning a water intake on an aircraft fuselage below an expected waterline upon ditching an aircraft in water to transport a flow of water to a wheel well for a nose landing gear at a designed flow rate of water; and
positioning an air vent in the wheel well at a height to allow a desired volume of water to fill the wheel well and adjust an attitude of the aircraft within a time period.

10. The method of claim 9 wherein:
the time period to adjust the attitude of the aircraft is based on the designed flow rate of water and the desired volume of water.

11. The method of claim 9 wherein:
the time period to adjust the attitude of the aircraft is less than about 10 seconds.

12. The method of claim 9 wherein:
the water intake is located on doors for the wheel well.

13. The method of claim 9 wherein:
the designed flow rate is at least 75 gallons per second.

14. The method of claim 9 wherein positioning the air vent further comprises:
positioning the height of the air vent to allow the desired volume of water to fill the wheel well and raise a rear emergency door above the expected waterline within the time period.

15. The method of claim 9 wherein:
positioning the water intake further comprises:
positioning the water intake toward a rear section of the fuselage; and
the method further comprises:
positioning tubing coupled with the water intake to transport the flow of water from the rear section of the fuselage to the wheel well.

16. The method of claim 9 further comprising:
positioning a valve that couples the water intake to the wheel well to adjust the designed flow rate of water.

17. An apparatus comprising:
an aircraft fuselage having a wheel well for a nose landing gear, the fuselage including:
a water intake located below an expected waterline upon ditching an aircraft in water to transport a flow of water to the wheel well;
a valve coupling the water intake to the wheel well to control a flow rate of the water to the wheel well; and
a vent in the wheel well to expel displaced air and allow water to fill the wheel well and adjust an attitude of the aircraft within a time period.

18. An apparatus comprising:
an aircraft fuselage having a forward compartment, the fuselage including:
a water intake located below an expected waterline upon ditching the aircraft in water to transport a flow of water to the forward compartment at a designed flow rate of water; and
an air vent in the forward compartment positioned at a height to allow a desired volume of water to fill the forward compartment, to adjust an attitude of the aircraft, and to raise a rear emergency door above the expected waterline within a time period.

19. An apparatus comprising:
an aircraft fuselage having a forward compartment, the fuselage including:
a water intake located toward a rear section of the fuselage that is below an expected waterline upon ditching the aircraft in water to transport a flow of water to the forward compartment at a designed flow rate of water;

tubing coupled with the water intake to transport the flow of water from the rear section of the fuselage to the forward compartment; and an air vent in the forward compartment positioned at a height to allow a desired volume of water to fill the forward compartment and adjust an attitude of the aircraft within a time period.

20. The apparatus of claim 19 wherein:

the height of the air vent is positioned to allow the desired volume of water to fill the forward compartment and raise a rear emergency door above the expected waterline within the time period.

* * * * *